(12) United States Patent
Anand (10) Patent No.: US 12,439,101 B2
(45) Date of Patent: Oct. 7, 2025

(54) ATTRIBUTE-BASED MOBILE EDGE COMPUTE CONTENT CACHING

(71) Applicant: DISH Wireless L.L.C., Englewood, CO (US)

(72) Inventor: Sudir Anand, Cincinnati, OH (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

(21) Appl. No.: 18/471,976

(22) Filed: Sep. 21, 2023

(65) Prior Publication Data

US 2025/0106446 A1     Mar. 27, 2025

(51) Int. Cl.
*H04N 21/231* (2011.01)
*H04N 21/4363* (2011.01)

(52) U.S. Cl.
CPC . *H04N 21/23106* (2013.01); *H04N 21/43637* (2013.01)

(58) Field of Classification Search
CPC .................. H04N 21/23106; H04N 21/43637
See application file for complete search history.

(56) References Cited

U.S. PATENT DOCUMENTS

| | | | | |
|---|---|---|---|---|
| 9,942,577 | B1* | 4/2018 | Burford | H04L 65/612 |
| 2005/0210119 | A1* | 9/2005 | Kumar | H04L 67/568 |
| | | | | 709/217 |
| 2011/0213800 | A1* | 9/2011 | Saros | G06Q 30/02 |
| | | | | 707/769 |
| 2014/0201258 | A1* | 7/2014 | Jowett | H04W 4/60 |
| | | | | 709/203 |
| 2014/0207912 | A1* | 7/2014 | Thibeault | H04L 65/612 |
| | | | | 709/219 |
| 2016/0241665 | A1* | 8/2016 | Covell | H04L 67/5681 |
| 2016/0323365 | A1* | 11/2016 | Wu | H04L 67/52 |
| 2017/0289593 | A1* | 10/2017 | Li | H04N 21/2408 |
| 2018/0176325 | A1* | 6/2018 | Liang | H04L 67/568 |
| 2019/0306265 | A1* | 10/2019 | Hakansson | H04L 67/5681 |
| 2020/0244758 | A1* | 7/2020 | Enguehard | H04L 67/288 |
| 2023/0120096 | A1* | 4/2023 | Kim | H04W 48/20 |
| | | | | 370/329 |

(Continued)

OTHER PUBLICATIONS

Ahmed et al., "A Survey on Mobile Edge Computing," 10th IEEE International Conference on Intelligent Systems and Control, Jan. 2016, 9 pages.

(Continued)

*Primary Examiner* — Chris Parry
*Assistant Examiner* — Steven C Nguyen
(74) *Attorney, Agent, or Firm* — Seed Intellectual Property Law Group LLP (57) ABSTRACT

A method and an apparatus for attribute-based edge compute content caching are provided. An edge compute server receives an identity for each of a plurality of user equipment, respectively, that are connected to a 5G wireless communications network. The edge compute server receives a plurality of sets of attributes associated with the plurality of user equipment, respectively, and determines, based on the plurality of sets of attributes, an attribute for which to cache content. The edge compute server requests a plurality of content identifiers associated with the attribute and caches cause content identified by the plurality of content identifiers.

20 Claims, 6 Drawing Sheets

(56) References Cited

U.S. PATENT DOCUMENTS

| | | | |
|---|---|---|---|
| 2023/0284205 A1* | 9/2023 | Nory | H04W 72/23 |
| | | | 370/329 |
| 2024/0022644 A1* | 1/2024 | Chen | H04L 67/52 |
| 2024/0137424 A1* | 4/2024 | Chung | H04L 41/122 |
| 2024/0276585 A1* | 8/2024 | Da Silva | H04W 76/27 |
| 2024/0284274 A1* | 8/2024 | Park | H04W 36/0061 |
| 2024/0334270 A1* | 10/2024 | Zhang | H04W 36/04 |

OTHER PUBLICATIONS

Safavat et al., "Recent advances in mobile edge computing and content caching," *Digital Communications and Networks* 6(2020):189-194, 2019. (6 pages).

* cited by examiner

FIG. 1

| UE ID | Attribute 1 Profession | Attribute 2 Location | Attribute 3 Frequently Requested Content |
|---|---|---|---|
| User Equipment 1 | 27: Realtor (commercial) | 31: Area 31 | 177: Social Media Feed 177<br>425: Application 425 |
| User Equipment 2 | 10: Physician | 3: Area 3 | 233: Website 233 |
| User Equipment 3 | 2: Teacher | 88: Area 88 | 401: Application 401 |
| User Equipment 4 | 93: Realtor (residential) | 3: Area 3 | 425: Application 425<br>142: Social Media Feed 142 |

ATTRIBUTE-BASED MOBILE EDGE COMPUTE CONTENT CACHING

BACKGROUND

Mobile devices receive large amounts of data from cellular communications networks. The data may be streamed audiovisual content or social networking feeds, among others. Content caching by mobile edge compute servers reduces latency and increases throughput in networks due to the fact that mobile edge compute servers shorten the path traversed by data in reaching the mobile devices. This in turn improves user experience.

BRIEF SUMMARY

Disclosed herein are techniques for attribute-based mobile edge compute content caching. An edge compute server may be provided in a wireless cellular communications network and may be positioned in closer proximity to a cell tower than data centers. Accordingly, the mobile edge compute server may provide content to user equipment connected to the cell tower without traversing relatively large segments of the network thereby reducing network congestion and data latency. The mobile edge compute server may selectively determine the content to cache based on the attributes of the connected user equipment.

An attribute of a connected user equipment may be a feature or characteristic of the user equipment, a user thereof or a subscriber account thereof. For example, the attribute may be a profession, a geographic area or an age group. The network includes a unified data repository (UDR) server of a cellular network operator. The unified data repository server may store the attributes of user equipment whose service is provided by the operator. The mobile edge compute server may access the attributes of the user equipment. The mobile edge compute server then identifies a specific attribute for which to cache content. The specific attribute may be an attribute that more than one connected user equipment have in common. The mobile edge compute server may then cache the content associated with the specific attribute. The mobile edge compute server may make the content available for relatively expeditious retrieval.

DETAILED DESCRIPTION

Figure 1:
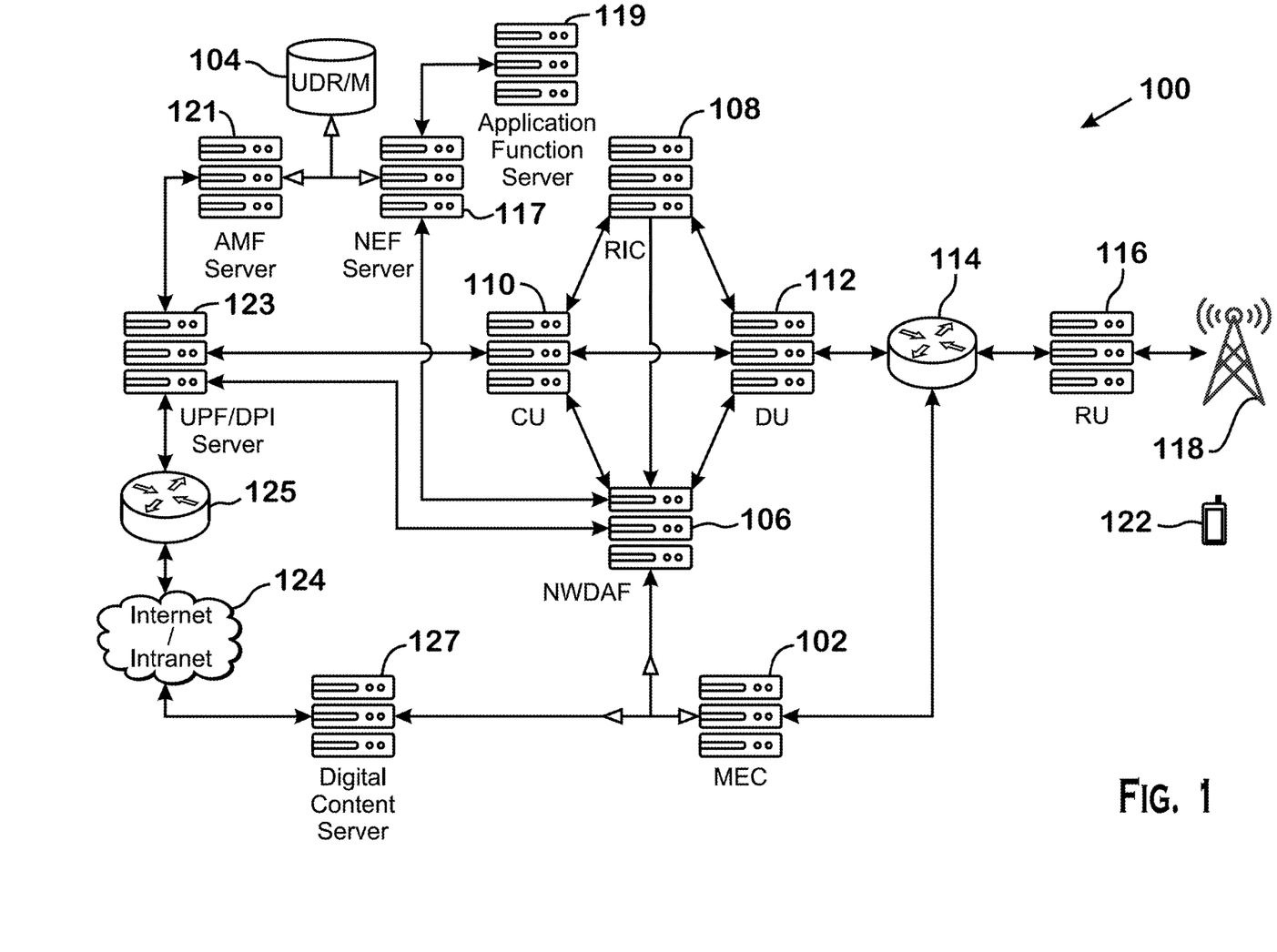
FIG. 1 shows an example of a wireless network system.

FIG. 1 shows an example of a wireless network system 100. The wireless network system 100 may be an open radio access network (O-RAN) wireless communications network. The O-RAN wireless network system 100 includes a mobile edge compute server 102, a unified data repository (UDR) server/unified data management (UDM) server 104, a network data analytics function (NWDAF) server 106, a radio access network (RAN) intelligent controller (RIC) 108, a central unit 110, a distributed unit 112, a cell site router 114, a radio unit 116, a radio frequency (RF) unit 118, a network exposure function (NEF) server 117, an application function (AF) server 119, an Access and Mobility Management Function (AMF) server 121, a User Plane Function and Deep Packet Inspection (UPF/DPI) server 123 and a router 125. The central unit 110, distributed unit 112, radio unit 116 and RF unit 118 collectively make up a next generation NodeB (gNB) 120. Also shown in FIG. 1 is a user equipment (UE) 122, which may communicate with the gNB 120 over the RF unit 118. Although one user equipment 122 is shown in FIG. 1, it is noted that the gNB 120 may serve multiple user equipment by sending downlink data to the user equipment and receiving uplink data from the user equipment. The uplink and downlink data may each include user data (e.g., general purpose data) and control data. It is noted that the wireless network system 100 may include additional entities other than those shown in FIG. 1.

The RF unit 118 may be a cellular tower. The RF unit 118 may include one or more antennas configured to wirelessly communicate with the user equipment 122. For example, the RF unit 118 may include one or more antenna arrays. Each array may include multiple antennas arranged linearly. Further, the array may be a planar array and may include multiple antennas arranged in two-dimensional (2D) space. The RF unit 118 may transmit radio waves (RF signals) to the user equipment 122 to send downlink data to the user equipment 122. The RF unit 118 may receive radio waves transmitted by the user equipment 122 and may, accordingly, receive uplink data from the user equipment 122.

The radio unit 116 may include a server, a baseband processor, a digital front-end and an analog front-end. The analog front-end may interface with the RF unit 118. The analog front-end may receive intermediate frequency (IF) signals representative of the RF signals from the RF unit 118. The analog front-end may also send intermediate frequency signals to the RF unit 118 for transmission as RF signals. The baseband processor may process the intermediate frequency signals received from the RF unit 118 and generate digital baseband signals therefrom. The baseband processor may process the intermediate frequency received from the RF unit 118 and generate digital baseband signals therefrom, and the baseband processor may process digital baseband signals received from the cell site router 114 and generate intermediate frequency signals therefrom.

The server or the baseband processor of the radio unit 116 may perform lower physical layer (PHY) processing on the digital signals received from the cell site router 114. The processing may include applying a fast Fourier transform (FFT) to the digital signals, performing precoding on the digital signals, modulating the digital signals, performing beamforming on the digital signals or a combination thereof. The server or the baseband processor of the radio unit 116 may perform lower PHY processing on the intermediate frequency signals received from the RF unit 118. The processing may include applying an inverse fast Fourier transform (IFFT) to the intermediate frequency signals, performing precoding on the intermediate frequency signals, demodulating the intermediate frequency signals, performing beamforming processing on the intermediate frequency signals or a combination thereof.

The cell site router 114 may include one or more servers and one or more switches, among other. The cell site router 114 routes data between the radio unit 116 and core-side network entities. As shown in FIG. 1, the cell site router 114 has connections with the radio unit 116, the mobile edge compute server 102 and the distributed unit 112. The cell site router 114 receives data originating from the radio unit 116 and determines whether to send the data to the mobile edge compute server 102 or the distributed unit 112. The cell site router 114 routes data from the mobile edge compute server 102 and the distributed unit 112 to the radio unit 116.

The mobile edge compute server 102 includes one or more servers, one or more data storage devices and one or more switches. For example, the mobile edge compute server 102 may be a small-scale data center. The mobile edge compute server 102 may include one or more types of memory or data storage devices for storing data. For example, the mobile edge compute server 102 may include electrically erasable, programmable, read-only memory (EEPROM), solid state drives (SSDs), hard disk drives (HDDs) or a combination thereof.

The mobile edge compute server 102 stores (or caches) data that may be requested by the user equipment 122 and provides the data to the user equipment 122 upon request. The mobile edge compute server 102 may be positioned in closer proximity to the user equipment 122 than content servers. Thus, the mobile edge compute server 102 may supply cached data to the user equipment 122. By doing so, the data is not trafficked through core network entities and traffic is reduced in the network 100. The mobile edge compute server 102 is connected to the internet 124 for retrieving content therefrom. As described herein, the content may be data that is sent to a user equipment 122. For example, the content may be data representing an application executable by an operating system of a device, such as a smartphone, tablet or computer, among others. The content may be streamed audiovisual media or a social media feed, among others.

The unified data repository server 104 may store and update information (including profile information) associated with the user equipment 122. The profile information associated with the user equipment 122 may be profile information of a user of the user equipment 122, a subscriber (of an operation) to which the user equipment 122 belongs or an account under which the user equipment 122 is registered. The profile information may include one or more attribute categories (e.g., characteristics or features) of the user equipment 122, user thereof or subscriber thereof. The attribute categories may include a profession of the user or subscriber or a geographic location in which the user primarily uses the user equipment 122, among others.

The NWDAF server 106 performs artificial intelligence-based or statistical-based analysis on the network 100. The NWDAF server 106 may collect data representing events occurring in the network 100 (such as the establishment of connections and performance anomalies) and measurements made in the network 100 (such as data throughput, data latency and network load). The NWDAF server 106 may apply artificial intelligence or statistical modeling to the collected data to change the operations of network entities. The NWDAF server 106 may change the operations of network entities to improve the user equipment 122 service experience, reduce costs and improve resource management. The NWDAF server 106 may use the artificial intelligence or statistical modeling to predict an impending reduction in a quality of service (QOS) provided by the network 100 and modify the operations of network entities to mitigate the reduction. The NWDAF server 106 may be manually programmed. For example, an operator or a user of the NWDAF server 106 may program the NWDAF server 106 with rules. Furthermore, the NWDAF server 106 may use machine learning to improve the programmed rules. The NWDAF server 106 may perpetually update data streams to perform machine learning.

The distributed unit 112 may include a server configured to perform higher PHY processing on the digital signals received, over the router 114, from the radio unit 116. The distributed unit 112 may perform resource element mapping, layer mapping, scrambling, precoding, modulation, encoding or a combination thereof on the digital signals. The distributed unit 112 then outputs, to the radio unit 110, the digital signals having performed higher PHY processing on the digital signals.

The central unit 110 may include a server configured to control the operations of the distributed unit 112. The central unit 110 performs Radio Resource Control (RRC) protocol connection establishment, connection release, broadcast of system information, radio bearer establishment, radio bearer reconfiguration, radio bearer release, connection mobility procedures, paging notification or a combination thereof.

In the gNB 120, the central unit 110 may serve and may be connected to multiple distributed units 112, and each distributed unit 112 may serve multiple radio units 116. Each radio unit 116 may serve multiple RF units 118. The central unit 110 and the distributed unit 112 may each be virtual servers that are hosted and virtualized using underlying computing resources (such as physical servers, routers and memory for data storage, among others). The underlying computing resources may be located in the same data center or different data centers. The central unit 106 has a backhaul connection to further core-side network entities.

The RAN intelligent controller 108 may be a server configured to control and optimize the functions of the wireless system 100. The RAN intelligent controller 108 may perform load balancing to mitigate network congestion. The RAN intelligent controller 108 may also deploy new services in the network 100. The RAN intelligent controller 108 may perform data processing and apply artificial intelligence (AI) or machine learning (ML) models to data trafficked over the system 100. The RAN intelligent controller 108 may perform real-time automation and enable proactive network resource management and service differentiation.

The mobile edge compute server 102 may retrieve and store content for the user equipment 122 based on profile information of the user equipment 122 stored by the unified data repository server 104. The profile information includes a set of attributes of the user equipment 122 or user or subscriber thereof. The mobile edge compute server 102 may store the content for the user equipment 122 based on the attributes provided by the profile information. The mobile edge compute server 102 may send the content to the user equipment 122 upon request by the user equipment 122. The mobile edge compute server 102 may send the content to other user equipment (e.g., having user equipment similar or identical attributes as the user equipment 122) if the other user equipment request the same content. While other user equipment having user equipment similar or identical attributes as the user equipment 122 are more likely to request the same content as the user equipment 122, having caches the content, the mobile edge compute server 102 may send the content to any requesting user equipment.

The network exposure function server 117 may be a server configured to monitor and configure a behavior of the network 100 for a number of different subscribers or connected devices. The network exposure function server 117 may expose core network capabilities to third parties. The network exposure function server 117 also provides security when services or the application function server 119 access core nodes. The network exposure function server 117 may be a proxy or Application Programming Interface (API) aggregation point or translator into the network 100. For example, the core network may be exposed by standard APIs to an internal or external developer ecosystem to be called on and consumed by applications and use cases.

The application function server 119 may perform control plane functionality within the network 100. The application function server 119 may facilitate interactions with the network exposure function server 117 and enable access to the network exposure function server 117. The application function server 119 may enable retrieving resources from the network exposure function server 117 and interacting with a policy control function (PCF) for policy control.

The Access and Mobility Management Function (AMF) server 121 may manage access and mobility in the network 100. The AMF server 121 may control and coordinate UE mobility and establishing and releasing UE connections. The AMF server 121 may retrieve subscriber information and authentication credentials from the unified data repository server 104 to confirm UE identity and determine UE access credentials. The AMF server 121 may supply the UPF/DPI server 123 with information specifying traffic routing and QoS policies.

The UPF/DPI server 123 handles user plane traffic in the core network and is a gateway between the UE 122 and the internet 124. It is noted that the internet 124 as described herein may be an intranet. The UPF/DPI server 123 routes packet data between the UE 122 and the internet 124, whereby the routing may be performed based on data receive from the AMF server 121. The UPF/DPI server 123 ensures compliance with Quality of Service (QoS) policies and prioritizes traffic and allocates network resources accordingly. The UPF/DPI server 123 may also perform packet inspection and identify the type of traffic occurring in the network. For example, the UPF/DPI server 123 may classify the traffic as video streaming, VoIP or web browsing, among others. The UPF/DPI server 123 may also perform malware detection and content filtering on the traffic.

The router 125 routes traffic between the UPF/DPI server 123 and the internet 124. It is noted that a digital content server 127 may store content accessible via the internet and may make the content available for retrieval by entities of the network 100. Although reference herein is made to the internet 124, content stored by the digital content server 127 may be accessed over an intranet.

Figure 2:
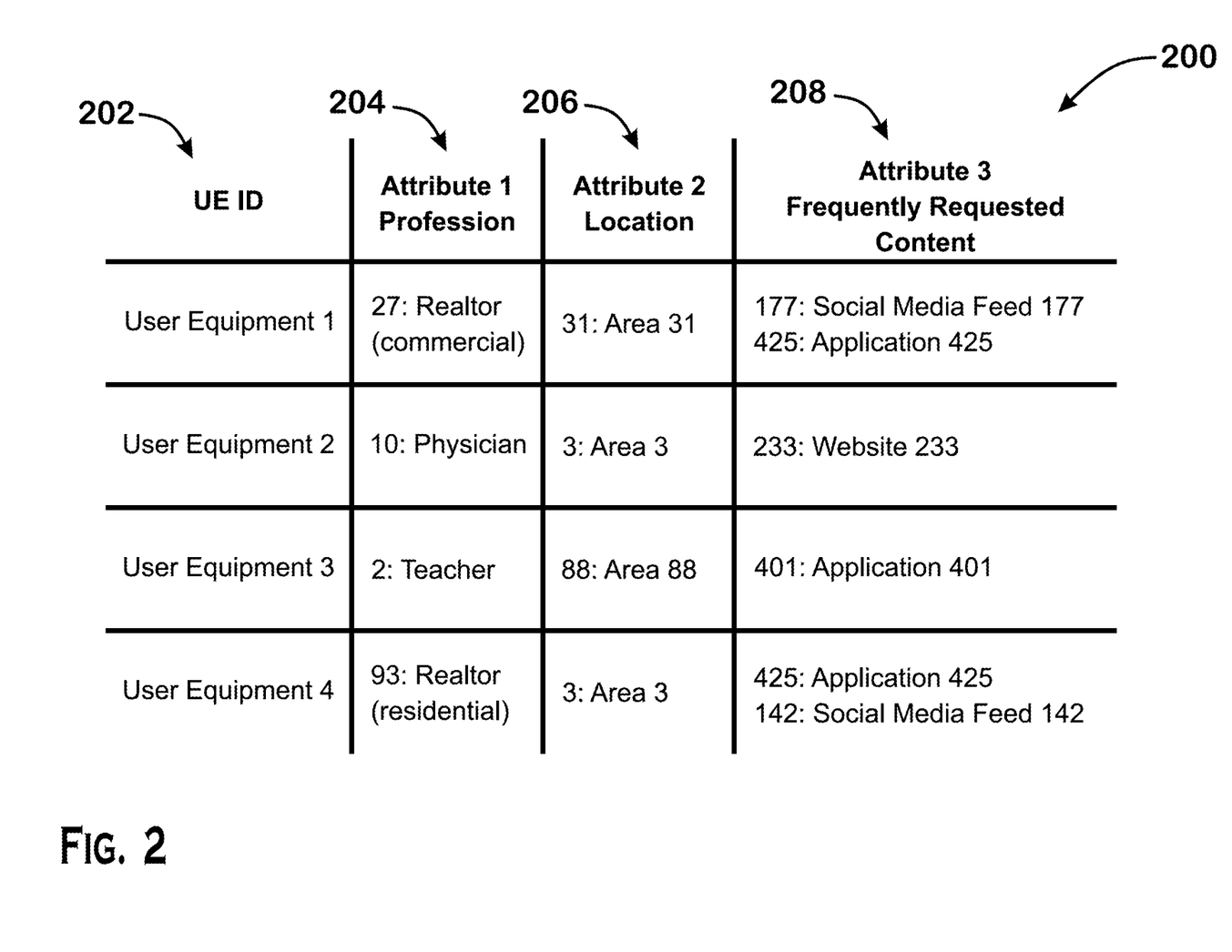
FIG. 2 shows an example of profile information maintained by a unified data repository server.

FIG. 2 shows an example of profile information 200 maintained by the unified data repository server 104. The profile information 200 includes, for each user equipment identity (UE ID) 202, first, second and third attribute categories 204, 206, 208. The user equipment identity 202 may be a Media Access Control (MAC) address, a Mobile Subscription Identification Number (MSIN) or an International Mobile Equipment Identifier (IMEI) of the user equipment 122. Additionally or alternatively, the user equipment identity 202 may be an identifier of the subscriber associated with the user equipment 122 or an identifier of the user of the user equipment 122.

The first attribute category 204 represents a profession of the user of the user equipment 122. The first attribute category 204 may include a value or a key associated with the profession. As shown in FIG. 2, a commercial realtor is represented by a value of 27 in the first attribute category 204, whereas a residential realtor is represented by a value of 93 in the first attribute category 204.

The second attribute category 206 of the profile information 200 represents a location where the user equipment 122 most frequently accesses the network 100. The location may be a geographic area. A geographic area may be associated with the user equipment 122 in the profile information 200 if the user equipment has accessed the network 100 from the geographic area for a longer duration of time than other geographic areas. Various geographic areas may be represented by respective values, whereby, as shown in FIG. 2, one geographic area (with which User Equipment 1 is associated) may be represented by a value of 31 and another geographic area (with which User Equipment 2 is associated) may be represented by a value of 3.

The third attribute category 208 of the profile information 200 represents frequently requested content of the user equipment 122. The third attribute category 208 may represent any content, such as a website, a social media feed or an application. The third attribute category 208 may identify the content using a Uniform Resource Locator (URL), among others.

The unified data repository server 104 may receive information from a service provider indicating the attributes of the user equipment 122. For example, the service provider may allow a user of the user equipment 122 to answer a survey providing the attributes for each attribute category, and an entity (e.g., a server of the service provider) may send the attributes to the unified data repository server 104. Alternatively, the unified data repository server 104 may determine the attributes 204, 206, 208 based on the user equipment 122 or uses thereof. For example, the unified data repository server 104 may track the location of the user equipment 122 and determine the attribute of the second attribute category 206 as the geographic area in which the user equipment 122 is most commonly located (or spends the most amount of time out of all predefined geographic areas) or in which the user equipment 122 downloads the most data (e.g., as measured in megabytes).

The unified data repository server 104 may also track the usage of the user equipment 122 and determine the first and third attributes of the first and third categories 204, 208, respectively, based on the usage. The usage may be application (or app) usage, visited websites or a combination thereof. For example, a realtor may use the user equipment 122 to visit websites of property listings (categorized as realty websites) and use applications that manage electronic agreements, whereas a teacher may visit educational websites (categorized as educational websites) and use education applications (categorized as educational applications). The unified data repository server 104 may determine the first attribute based on the content used by the user equipment.

The unified data repository server 104 may determine the third attribute based on the content most frequently used by the user equipment 122. For example, the unified data repository server 104 may track the content (including websites, applications or social media content, among others) accessed by the user equipment 122 and may determine the third attribute to include the content most frequently accessed by the user equipment 122. For example, the third attribute 208 may include a number of content (such as three or four, among others) that is most frequently accessed by the user equipment 122.

Another attribute category that may be part of the profile information 200 may include an age group of a user of the user equipment 122. The age group may, for example, specify whether the user is under 18 years of age, between 18 and 35 years of age, between 35 and 60 years of age, between 60 and 75 year of age or over 75 years of age.

Another attribute category that may be part of the profile information 200 may include categorizing the user of the user equipment 122 as a parent or a non-parent or categorizing the user as a teenager or an adult. Another attribute category be an educational level of the user.

Time may also be an attribute category. The time may be an instant or a time interval during which the user equipment triggers download of content. For example, if a user wakes up at 7 am and checks the performance of Asian stock market (the Hong Kong Hang Seng, the Mumbai Sensex or the Japan Nikkei 225), the content may be associated with an expected time instant of retrieval 7 am. Accordingly, the Asian stock market content may be cached for a period of time surrounding 7 am, such as an interval that is +/−one hour from 7 am or 6 am to 8 am. The mobile edge compute server 102 may not cache the Asian stock market content for other time periods outside the time interval. Each content identified in the profile information 200 may be associated with a time attribute or multiple identified content may be associated with the same time attribute.

The mobile edge compute server 102 may be associated with the radio unit 116, the distributed unit 112, the central unit 110, the gNB 120 or a cell thereof. The mobile edge compute server 102 store data for user equipment connected to the radio unit 116, the distributed unit 112, the central unit 110, the gNB 120 or the cell thereof. The mobile edge compute server 102 may be positioned in close geographic proximity to the radio unit 116, the distributed unit 112, the central unit 110 or the gNB 120 in order to allow for expeditious delivery of stored content. The mobile edge compute server 102 may determine or identify the content to be cached based on the profile information of the served user equipment 122 that is maintained by the unified data repository server 104.

The unified data repository server 104 may evaluate the profile information 200 of the user equipment 122 to identify content for caching based on an attribute associated with the user equipment 122. The unified data repository server 104 may determine the most frequently requested content for particular user equipment attributes and may make identifiers of the content available to the mobile edge compute server 102.

Figure 3:
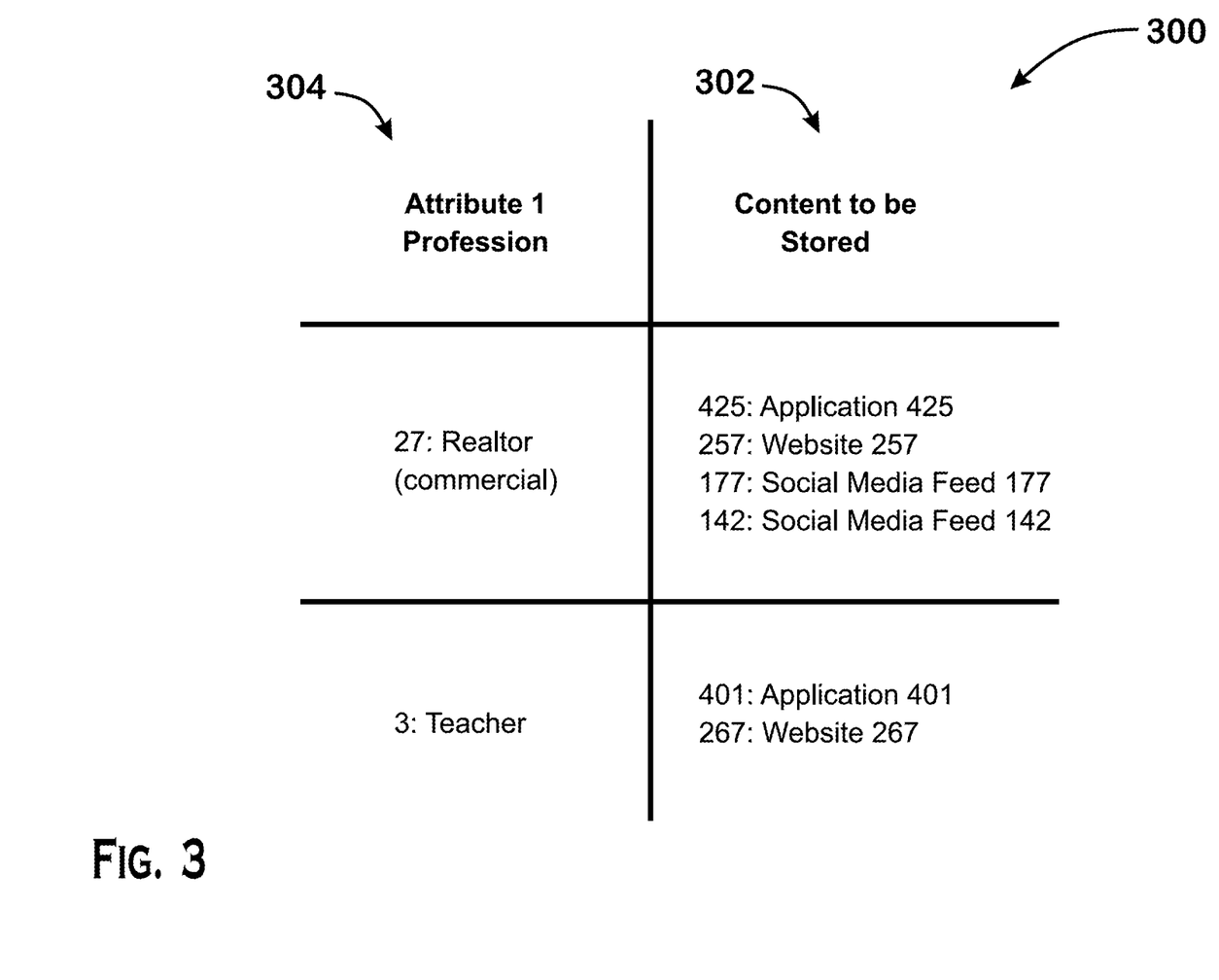
FIG. 3 shows a table identifying content to be stored for a user equipment attribute category.

FIG. 3 shows a table 300 identifying content to be stored 302 for a user equipment attribute category 304. The table 300 associates the attribute category 304 (shown to be a profession of a user of the user equipment 122) with the content to be stored 302 for the attribute. The unified data repository server 104 may determine the content to be stored 302 based on the frequently requested content of user equipment having the attribute of the attribute category 304. For example, for the realtor profession attribute, the unified data repository server 104 determines the content most frequently requested for user equipment having a realtor profession attribute. The user equipment may be all user equipment of a service provider or user equipment connected to a particular radio unit 116, distributed unit 112, central unit 110, gNB 120 or cell thereof. The user equipment may be connected to a radio unit 116, distributed unit 112, central unit 110, gNB 120 or cell thereof when the user equipment is in a connected state (for example, a radio resource control (RRC) connected state) with the radio unit 116, distributed unit 112, central unit 110, gNB 120 or cell, respectively.

The unified data repository server 104 may limit the number of content to be stored for the particular profession to a specified number, such as 20 or 30. By way of example, FIG. 3 shows five of the most frequently requested content of user equipment associated with the realtor profession attribute and two of the most frequently requested content of user equipment associated with the teacher profession attribute. For example, Application 425 may be DocuSign® that the commercial realtor as well as the realtor's clients and other parties to real estate transactions use to view and sign documents. Website 257 may be mls.com of the Multiple Listing Network®, zillow.com or redfin.com. Social media feed 177 may be the twitter feed of the National Association of Home Builders, and social media feed 142 may be the Facebook page of the Mortgage Bankers Association. Further, Application 401 used by the teacher may be the Canvas learning management application of Instructure and website 267 may be the youtube.com page of the Khan Academy that the teacher accesses for educational videos. The mobile edge compute server 102 may cache the content for each profession attribute to make the content expeditiously available to user equipment.

The mobile edge compute server 102 may have a time-based or content-based refresh that is variable/flexible or fixed. The mobile edge compute server 102 may have a time schedule for updating the cached content in which the mobile edge compute server 102 removes "stale" cached content and adds further cached content. The time schedule may be fixed (e.g., every hour) or may vary. Content-based refresh may use the time attribute associated with content to determine when to cache content or remove cached content. The mobile edge compute server 102 may cache the content such that the content is available from the mobile edge compute server 102 at the expected time instant of retrieval or during the time interval surrounding the expected time instant.

Figure 4A:
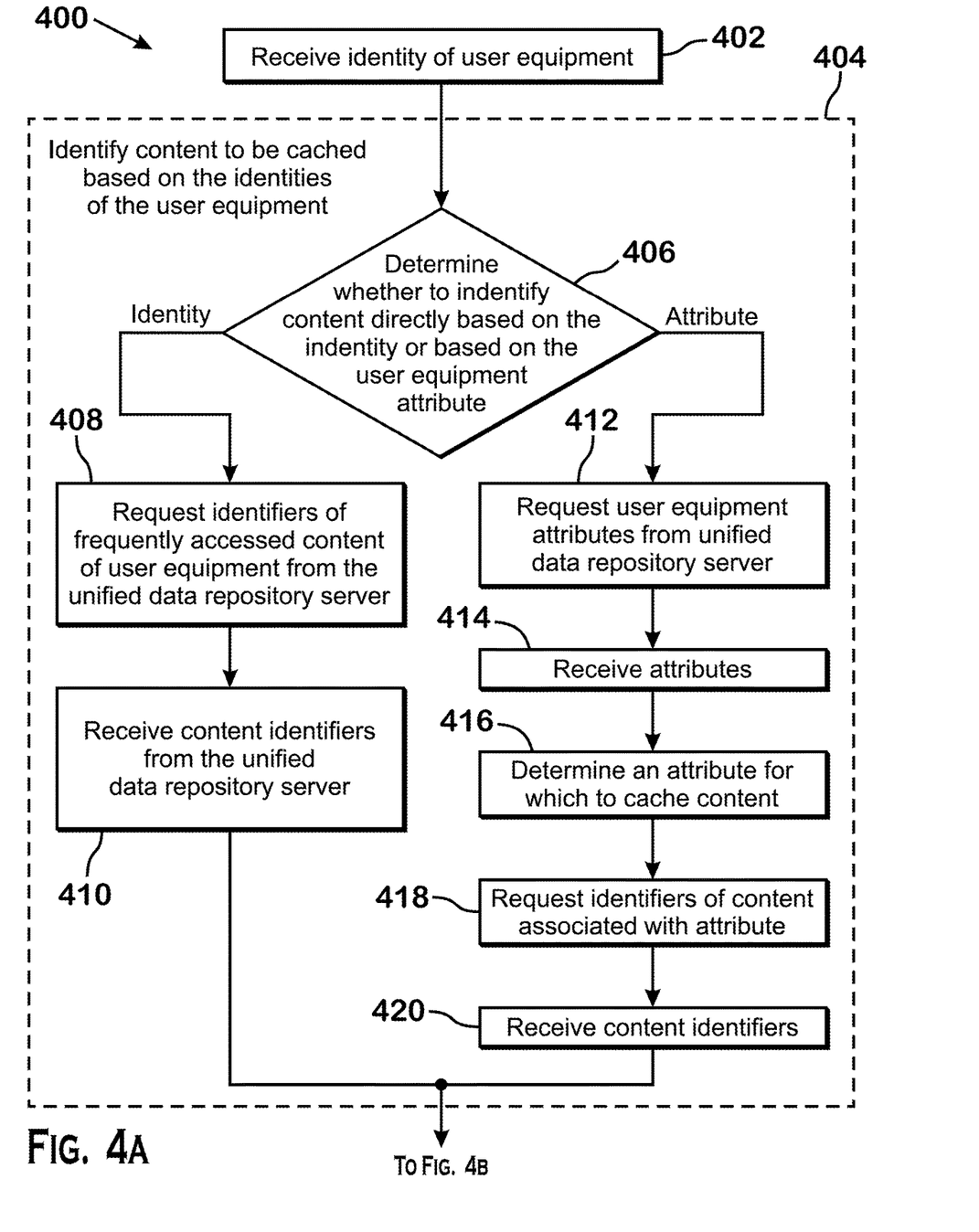
FIGS. 4A and 4B show a flow diagram of a method for caching content by an edge compute server.
Figure 4B:
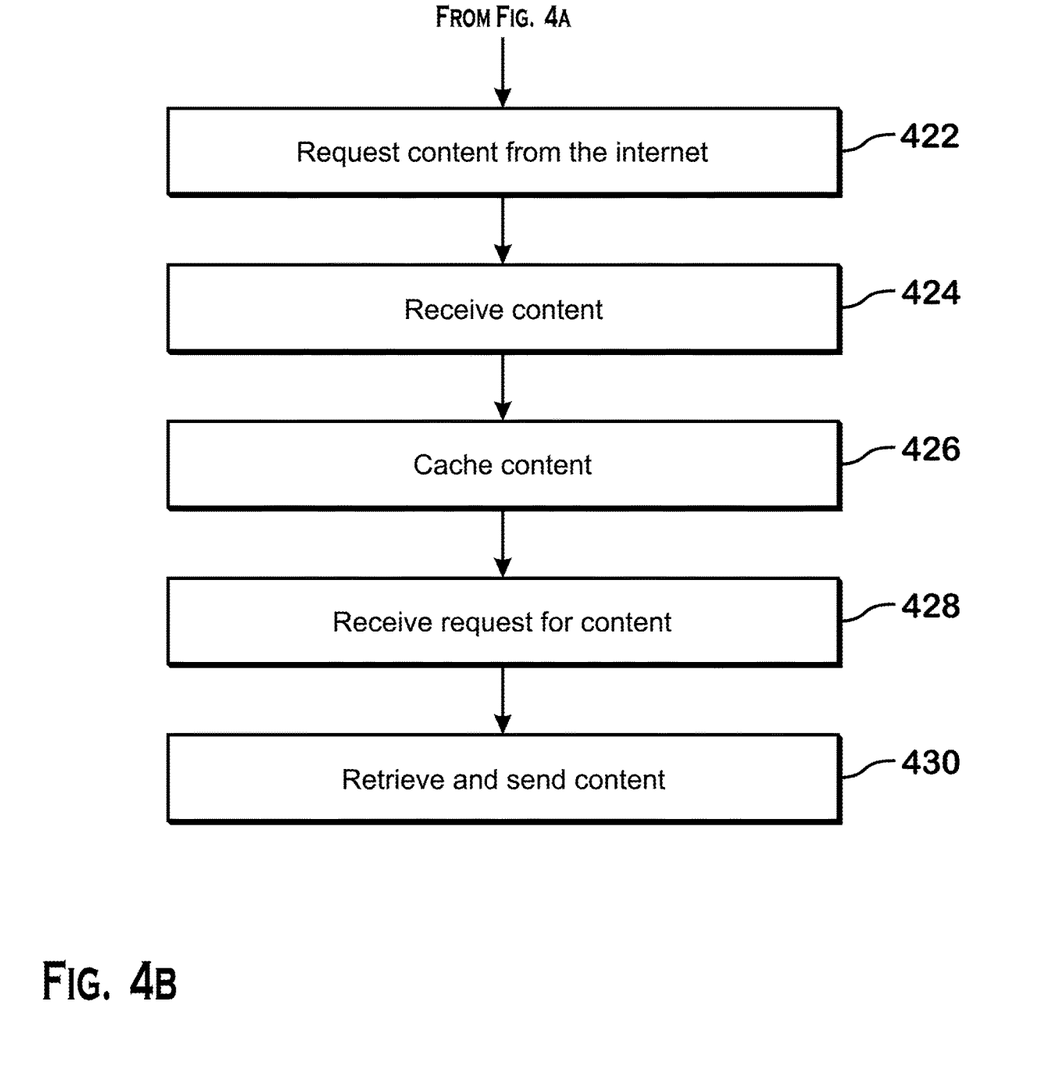

FIGS. 4A and 4B show a flow diagram of a method 400 for caching content by the mobile edge compute server 102. In the method 400, the mobile edge compute server 102 receives, at 402, identity of each user equipment that is connected to the radio unit 116, distributed unit 112, central unit 110, gNB 120 or cell thereof. The mobile edge compute server 102 may receive the identities from the radio unit 116, distributed unit 112, central unit 110, gNB 120 or another network entity.

At 404, the mobile edge compute server 102 identifies content to be cached based on the identities of the user equipment. The mobile edge compute server 102 may identify the content directly based on the identities of connected user equipment or based an attribute associated with the user equipment. The mobile edge compute server 102 determines, at 406, whether to identify the content based on the identities of the user equipment or based on the attribute associated with the user equipment. In response to determining to identify the content based on the identities of the user equipment, the mobile edge compute server 102, at 408, requests from the unified data repository server 104 identifiers of content frequently accessed by the user equipment. The mobile edge compute server 102 may send a request to the unified data repository server 104. The request may include the identities of the connected user equipment. The unified data repository server 104 may identify the content from the profile information 200 maintained by the unified data repository server 104.

For each user equipment, the unified data repository server 104 may determine, based on the user equipment identity 202, the third attribute 208 representing the frequently requested content of the user equipment 122. The unified data repository server 104 then sends identifiers of the frequently requested content to the mobile edge compute server 102. At 410, the mobile edge compute server 102 receives the content identifiers from the unified data repository server 104.

In response to determining to identify the content based on the identities of the user equipment, the mobile edge compute server 102, at 408, requests from the unified data repository server 104 identifiers of content frequently accessed by the user equipment. The mobile edge compute server 102 may send a request to the unified data repository server 104. The request may include the identities of the connected user equipment. The unified data repository server 104 may identify the content from the profile information 200 maintained by the unified data repository server 104. The profile information 200 associates each user equipment with identifiers of content frequently requested by the user equipment.

Content can also be triggered by a user's alarm settings (for example, daily, weekday or weekend alarm settings). The NWDAF server 106 is coupled to both the network exposure function server 117 and the application function server 119. The NWDAF server 106 may expose the network exposure function server 117 and the application function server 119 and use the exposure together with machine learned behaviors. The NWDAF server 106 may use the exposure function to cache a larger amount of content desired by users (including videos or news, among others).

Furthermore, in the Ultra Reliable Low Latency Communication (e.g., Slice 2 or Slice Service Type) content including high frequency trading information, emergency information (such as current tornado conditions at geographic location, fire containment updates or earthquake warnings), stock price and volume trends, sports results and news for betting, cryptocurrency global price trends, celebrity updates or tweets, among others, is cached by the mobile edge compute server 102.

For each user equipment, the unified data repository server 104 may determine, based on the user equipment identity 202, the third attribute 208 representing the frequently requested content of the user equipment 122. The unified data repository server 104 then sends the identifiers of the frequently requested content to the mobile edge compute server 102. At 410, the mobile edge compute server 102 receives the content identifiers from the unified data repository server 104.

In response to determining to identify the content based on the attribute of the user equipment, the mobile edge compute server 102, at 412, requests user equipment attributes from the unified data repository server 104. The mobile edge compute server 102 may send a request to the unified data repository server 104. The request may include the identities of the connected user equipment. The unified data repository server 104 may identify the set of attributes for the user equipment from the profile information 200 maintained by the unified data repository server 104. The profile information 200 associates each user equipment with a set of attributes. For each user equipment, the unified data repository server 104 may determine, based on the user equipment identity 202, the set of attributes associated with the user equipment (for example, the first and second attributes 204, 206 shown in FIG. 2). The set of attributes may exclude a content-based attribute, such as attributes of the third attribute category 208 representing the frequently requested content of the user equipment. The unified data repository server 104 then sends the sets of attributes of the user equipment to the mobile edge compute server 102. At 414, the mobile edge compute server 102 receives the sets of attributes.

At 416, the mobile edge compute server 102 determines an attribute of connected user equipment for which to cache content. The mobile edge compute server 102 may select an attribute category (such as, profession). The mobile edge compute server 102 determines, for the selected attribute category, an attribute for which to cache content. The attribute may be the most commonly occurring attribute of the attribute category among connected user equipment. For example, if there are 50 connected user equipment and among the fifty connected user equipment, 27 user equipment are associated with the teacher attribute for the attribute category 304, then the mobile edge compute server 102 determines to cache content for the teacher attribute. Accordingly, the mobile edge compute server 102 caches content for a relatively broad segment of connected users in a geographic area served by the mobile edge compute server 102. The mobile edge compute server 102 may determine multiple attributes for multiple attribute categories, respectively.

The mobile edge compute server 102 may determine the most commonly occurring attribute within a category or irrespective of the category. For example, if there are 50 connected user equipment and the profile information includes three attribute categories, then there will be 150 total attributes for the 50 connected user equipment. The mobile edge compute server 102 may select the most commonly occurring attribute irrespective of the category to which the attribute belongs.

At 418, the mobile edge compute server 102 requests from the unified data repository server 104 identifiers of content associated with the determined attribute. The mobile edge compute server 102 may send a request to the unified data repository server 104 including an identifier of the determined attribute. The unified data repository server 104 may identify the content from the table 300. The unified data repository server 104 then sends identifiers of the content associated with attribute to the mobile edge compute server 102. At 420, the mobile edge compute server 102 receives the content identifiers from the unified data repository server 104.

The mobile edge compute server 102, at 422, requests the content from the internet 124. The mobile edge compute server 102 may request the content based on the received identifiers. For example, the mobile edge compute server 102 may query a Domain Name System (DNS) server and receive an internet protocol (IP) associated with a domain name. The mobile edge compute server 102 may perform a Transmission Control Protocol (TCP) handshake or a Transport Layer Security (TLS) handshake with a server of the internet 124 associated with the domain name. The mobile edge compute server 102 may request the content from the server based on the receive content identifier. Because various content may be stored by different servers, the mobile edge compute server 102 may perform the query and handshake procedure with different servers that store different content, respectively. The mobile edge compute server 102 receives the content from the internet 124 at 424. The mobile edge compute server 102, at 426, caches the content in a memory of the mobile edge compute server 102. The mobile edge compute server 102, at 426, may cache the content's timestamp (at starting time of original content transfer from server of the internet 124) as a parameter for the content in a memory of the mobile edge compute server 102. The mobile edge server may also use a live-feed flag.

Use of the live-feed flag may ensure that caching is designed as single to multicast configuration and gets delivered to multiple users.

The mobile edge compute server 102, at 428, receives a request for content. The mobile edge compute server 102 may receive the request from the cell site router 114. When the user equipment requests content, the request is routed from the radio unit 116 to the cell site router 114. The cell site router 114 sends the request to the mobile edge compute server 102. The request may include an identifier of the content. The mobile edge compute server 102 may determine, based on the identifier, whether the mobile edge compute server 102 has cached the content. For example, the mobile edge compute server 102 may store a table including the identifiers of content cached by the mobile edge compute server 102. The mobile edge compute server 102 may interrogate the table and determine whether the identifier is listed in the table. The mobile edge computer server 102 may use the timestamp in 426 to send a control message to check for the most current content update status to the content provider. For example, the content provider may be DISH network. If no update was made to the content, a control message indicating that there is no update may be returned to the mobile edge compute server 102. If content update was made, updated content is cached in the mobile edge compute server 102 relayed to user. In the case of live-feed flag being enabled, the content is live streamed to a single user or multiple users. If so, the mobile edge compute server 102 retrieves the content from the memory of mobile edge compute server 102 and streams the content. The cell site router 114 routes the content to user equipment 122 via gNB 120 entities of the radio unit 116 and RF unit 118.

The unified data repository server 104 may store the profile information associated with all user equipment of an operator. As described herein, the profile information associated with the user equipment 122 may be profile information of a user of the user equipment 122, a subscriber of the operation to which the user equipment 122 belongs or an account under which the user equipment 122 is registered. The unified data repository server 104 may associate the profile information with a particular radio unit 116, distributed unit 112, central unit 110, gNB 120 or cell thereof to which the user equipment is connected.

The mobile edge compute server 102 may be location-specific or geographic area-specific. The mobile edge compute server 102 may cache content for user equipment connected to or served by a particular radio unit 116 (or a particular distributed unit 112 or central unit 110). The user equipment may release its connection to a first radio unit and establish a connection to a second radio unit (for example, that serves a different geographic area). The mobile edge compute server 102 may receive an indication of a connection release from the radio unit 116, distributed unit 112 or central unit 110 from which the user equipment was released. The mobile edge compute server 102 may receive an indication of a connection establishment from the radio unit 116, distributed unit 112 or central unit 110 with which the user equipment established connection.

The connection release may trigger the mobile edge compute server 102 of the first radio unit to reevaluate the content that the mobile edge compute server 102 caches and reperform the method 400 of portions thereof. In response to the connection release or the connection establishment, the mobile edge compute server 102 may perform the method 400 for caching content again to determine the identities of content to cache. For example, if there is a connection release, the identity of the released user equipment may be excluded from the identities of connected user equipment that the mobile edge compute server 102 receives at 402. The mobile edge compute server 102 may perform the method 400 without accounting for and while excluding the identity of the released user equipment.

The mobile edge compute server 102 may store the sets of attributes received at 414. When a connection of a user equipment is released, the mobile edge compute server 102 may remove the set of attributes associated with the user equipment from the stored sets of attributes. The mobile edge compute server 102 may then determine, at 416, the attribute for which to cache content based on the stored sets of attributes having removed the set of attributes associated with the released user equipment.

When a user equipment establishes a new connection to the radio unit 116, distributed unit 112, central unit 110, gNB 120 or cell thereof that is served by the mobile edge compute server 102, the identity of the user equipment is included in the identities of connected user equipment that the mobile edge compute server 102 receives at 402. The mobile edge compute server 102 may perform the method 400 while accounting for and including the identity of the connected user equipment. For example, the mobile edge compute server 102 may request the set of attributes of the newly connected user equipment and add the set to the existing stored sets of attributes of connected user equipment. The mobile edge compute server 102 may determine the attribute for which to cache content based on the combination of the set of attributes of the newly connected user equipment and the existing sets of attributes of connected user equipment. Thus, the mobile edge compute server 102 may in real-time adjust the cached content based on the attributes of user equipment as connections are established and released.

In response to receiving a request for content from the user equipment 122, the mobile edge compute server 102 may communicate with the RAN intelligent controller 108, the NWDAF server 106 or both to improve content delivery to the user equipment 122 by, for example, increasing throughput and reducing latency and network load.

Figure 5:
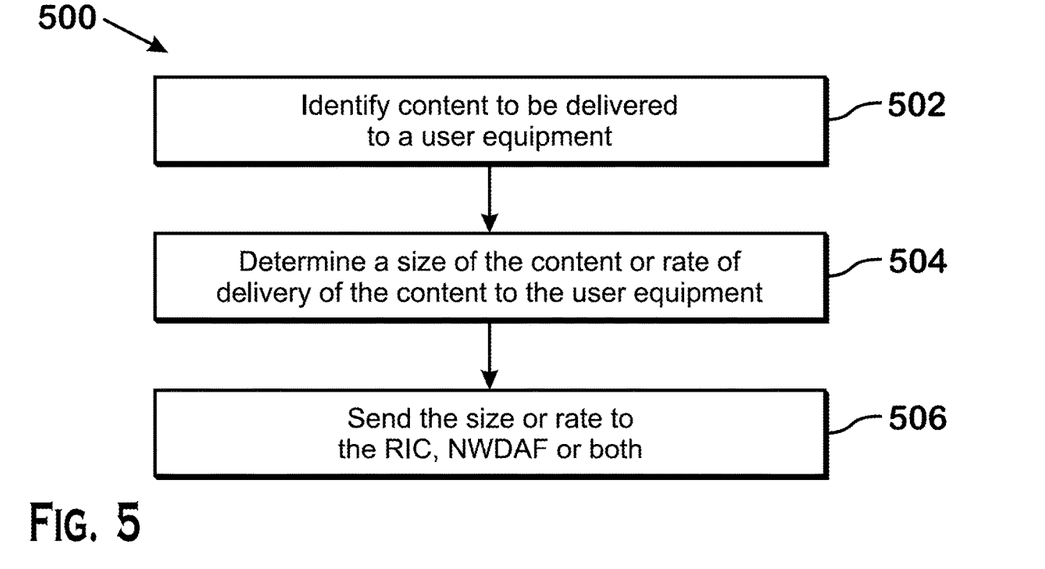
FIG. 5 shows a method for edge compute server reporting of content delivery.

FIG. 5 shows a method 500 for mobile edge compute server 102 reporting of content delivery. In the method 500, the mobile edge compute server 102, at 502, identifies content to be delivered to the user equipment 122. As described herein, the mobile edge compute server 102 receives a request for content originating from the user equipment 122 and determines, based on an identifier associated with the request, whether the mobile edge compute server 102 has cached the content. For example, the mobile edge compute server 102 may determine whether the content is cached by checking whether the identifier is listed in a table of identifiers of content that is cached by the mobile edge compute server 102.

In response to determining that the content is cached, the mobile edge compute server 102 may send information to the RAN intelligent controller 108, the NWDAF server 106 or both indicating. The information may indicate that a transmission of the content over the network 100 is being performed or will be performed. The mobile edge compute server 102 may prioritize sending the information to the RAN intelligent controller 108 or the NWDAF server 106. The mobile edge compute server 102 may send the information before sending the content to the user equipment 122 or at the same time as the mobile edge compute server 102 sends the content to the user equipment 122.

At 504, the mobile edge compute server 102 determines a size of the content or a rate of delivery of the content to the user equipment 122. The mobile edge compute server 102 may determine other characteristics of the content, such as a type of the content including audio, video or an application. At 506, the mobile edge compute server 102 sends the size or the rate to the RAN intelligent controller 108, the NWDAF server 106 or both. Alternatively or additionally, the mobile edge compute server 102 may send the other characteristics. The mobile edge compute server 102 may send all characteristics that it determines for the content, whereby, for example, the mobile edge compute server 102 may send the size, the rate and the type of content to the network entities.

The RAN intelligent controller 108 may perform load balancing in the network based on the received information. The RAN intelligent controller 108 may change the allocation of communication resources available to a network entity of the gNB 120 to reduce the latency in delivering the content to the user equipment 122. The RAN intelligent controller 108 may increase the resource elements (REs), bandwidth or resource blocks (RBs), among other resources, that are available to be used by the radio unit 116, RF unit 118 or the user equipment 122 in order to make more resources available for the delivery of the content. The RAN intelligent controller 108 may determine the amount of the change in the resources based on the size, rate or type of content. The change in the amount of resources may be positively correlated with both the size and the rate such as the resources are increased as the size or the rate increase and vice-versa. The type of content may also inform the change in the resources. For example, as video content uses more data than audio content, more resources are allocated when video content is delivered than audio content.

The NWDAF server 106 may use the information received from the mobile edge compute server 102 and may perform artificial intelligence or statistical modeling based on the information. The NWDAF server 106 may change the operations of network entities and improve the user equipment 122 service experience, reduce costs and improve resource management. The NWDAF server 106 collects information about events occurring in the network. The mobile edge compute server 102 may report content delivery events to the NWDAF server 106 for use by the NWDAF server 106 in adjusting operation of the network.

Figure 6:
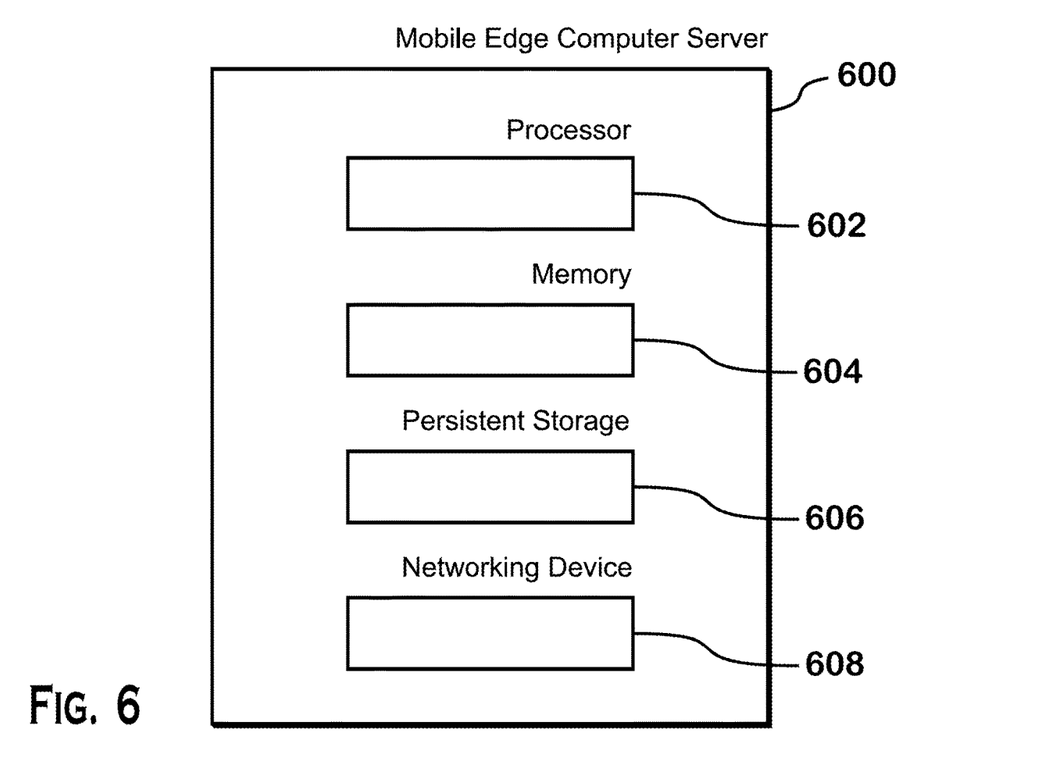
FIG. 6 shows a block diagram of an edge compute server.

FIG. 6 shows a block diagram of a mobile edge compute server 600. In one embodiment, the edge compute server is interacting with mobile devices, such as phones, watches, notepads, portable computers, cars, wearables, IoT devices, machine learning software/services on portable or fixed wireless access (5G FWA) devices, and the like and thus is referred to as a mobile edge server, indicating its function and not that it is required to be mobile itself. The system can also be used with communication devices that are not mobile. The mobile edge compute server 600 may be one or more server computer systems, cloud computing platforms, virtual machines or a combination thereof. The mobile edge compute server 600 includes a processor 602, memory 604, persistent storage 606, and networking device 608. The mobile edge compute server 600 may also include other components (not shown).

The processor 602 may be a controller, microcontroller or microprocessor, and may include a central processing unit ("CPU") or an arithmetic and logic unit (ALU) for executing computer programs or executable instructions. The mobile edge compute server 600 uses the processor 602 to identify content to be cached based on the attributes or identities of connected user equipment as described herein. The mobile edge compute server 600 uses the processor 602 to perform the techniques described herein including the method 400 described with reference to FIG. 4. For example, the mobile edge compute server 600 may use the processor to query the table including the identifiers of content cached by the mobile edge compute server 102 and determine whether requested content is cached.

The memory 604 stores executable instruction and data. The processor 602 executes the executable instructions, which causes the processor 602 to perform the technique described herein including requesting from the unified data repository server 104 identifiers of content frequently accessed by a user equipment, requesting user equipment attributes from the unified data repository server 104, determining an attribute of connected user equipment for which to cache content and requesting from the unified data repository server 104 identifiers of content associated with the determined attribute, among others. The memory 604 may also store an operating system including a kernel and device drivers. The memory 604 may also data, such as the table of identifiers described herein.

The persistent storage device 606 may be a virtual drive, a hard drive or a flash drive, among others. The persistent storage device 606 persistently stores programs and data. The persistent storage device 606 may store the content that is cached by the mobile edge compute server 600. The persistent storage device 606 may include one or more types of memory or data storage devices for storing data. For example, the mobile edge compute server 102 may include electrically erasable, programmable, read-only memory (EEPROM), solid state drives (SSDs), hard disk drives (HDDs) or a combination thereof.

The networking device 608 enables the mobile edge compute server 600 to communicate with other devices, such as the cell site router 114, the NWDAF server 106, the RAN intelligent controller 108 and servers of the internet 124. The networking device 608 may send requests, information and content to the devices with which the networking device 608 communicates and receive requests, information and content from the devices. The networking device 608 may be a modem, antenna, radio transmitter, receiver or transceiver, optical transmitter, receiver or transceiver or wireless or wired port, among others. The networking may be wired copper, fiber or wireless mediums. The wireless may be single carrier or aggregated carriers in the low band (less then 1 GHz, such as powered RFID), mid band (1 GHz to 3 GHz for Blue tooth, Wi-Fi 6 or 7), mid to high band (mmWave) and/or high band (10 GHz to 24 GHz satellite). The networking device may negotiate the coordinated reliable delivery of content using the standardized protocols used in any media. Further, the mobile edge compute server 600 may include networking hardware, such as switches, routers or repeaters, among others. The mobile edge compute server 600 may output data over the networking device 608 to other devices in the network and receive data from the other devices in the network over the networking device 608.

It is noted that other entities of the network, such as the unified data repository server 104, the NWDAF server 106 and the RAN intelligent controller 108 may have a similar configuration as that of the mobile edge compute server 600 described with reference to FIG. 6 herein. The mobile edge compute server 600, which may be a 5G MEC, may on its own, or in combination with with the unified data repository server 104, the NWDAF server 106 and the RAN intelligent controller 108 study (or machine-learn) content transfer patterns to generate machine-learned data that may be further processed and aggregated within the mobile edge compute server 600 to form higher neural learning logic that is able to leverage various business verticals that may include any of gaming, speeding up financial transaction, speed up or slow down Industry 4.0 connected/near real time manufacturing, autoconfiguring medical network slices, directed entertainment, and/or mass market entertainment (concerts or football games). The machine learning algorithm may then be configurable using the application function server 119 via the NEF server 117 and NWDAF sever 106 to fine tune to logic of the mobile edge compute server 600. In an embodiment, the application function server 119 may use a direct connection to the mobile edge compute server 102 via the networking device 608 to permit human intervention to optimize, or fine tuning the machine learning algorithms and neural network algorithms of the mobile edge compute server 102.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first edge compute server of a core network, comprising:
   a processor of the first edge compute server of the core network configured to:
   receive an identity for each of a plurality of user equipment, respectively, that each have a radio resource control (RRC) connection to a first radio unit of the core network;
   request, from a unified data repository server serving the first radio unit of the core network, a plurality of sets of attributes associated with the plurality of user equipment, respectively;
   receive, from the unified data repository server, the plurality of sets of attributes;
   determine, based on the plurality of sets of attributes, an attribute for which to cache content;
   request, from the unified data repository server, a plurality of content identifiers associated with the attribute;
   receive, from the unified data repository server, the plurality of content identifiers;
   cause content identified by the plurality of content identifiers to be cached; and
   in response to a release of the RRC connection of a first user equipment of the plurality of user equipment to the first radio unit, remove a first set of attributes associated with the first user equipment from the plurality of sets of attributes; and
   a memory of the first edge compute server of the core network configured to:
   store the content identified by the plurality of content identifiers.

2. The first edge compute server of claim 1, wherein the plurality of user equipment are connected to the same cell, the same radio unit or the same distributed unit of the core network.

3. The first edge compute server of claim 1, wherein the processor is configured to determine the attribute by:
   identifying a most commonly occurring attribute in the plurality of sets of attributes; and
   selecting the most commonly occurring attribute as the attribute for which to cache content.

4. The first edge compute server of claim 1, wherein the attribute is a characteristic of the first user equipment of the plurality of user equipment, a user of the first user equipment or a subscriber associated with the first user equipment.

5. The first edge compute server of claim 1, wherein the attribute is a profession of a user of the first user equipment of the plurality of user equipment, a geographic location in which the first user equipment is most commonly positioned or an age group of the user.

6. The first edge compute server of claim 1, wherein the processor is configured to:
   cause the plurality of sets of attributes to be stored;
   receive an indication that the RRC connection of the first user equipment of the plurality of user equipment to the first radio unit has been released;
   in response to receiving the indication, remove the first set of attributes associated with the first user equipment from the plurality of sets of attributes; and
   after removing the first set of attributes from the plurality of sets of attributes, determine the attribute for which to cache content based on the plurality of sets of attributes.

7. The first edge compute server of claim 1, wherein the processor is configured to:
   receive, from the first user equipment of the plurality of user equipment, a request for first content associated with a first content identifier of the plurality of content identifiers;
   in response to receiving the request, determine a size of the first content or a rate of delivery of the first content to the first user equipment; and
   report the size or the rate to a radio access network (RAN) intelligent controller or a network data analytics function (NWDAF) server of the core network.

8. The first edge compute server of claim 1, wherein the first set of attributes are evaluated for content caching by a second edge compute server serving a second radio unit with which the user equipment establishes a new RRC connection.

9. A method, comprising:
   receiving, by a first edge compute server of a core network, an identity for each of a plurality of user equipment, respectively, that each have a radio resource control (RRC) connection to a first radio unit of the core network;
   requesting, from a unified data repository server serving the first radio unit of the core network, a plurality of sets of attributes associated with the plurality of user equipment, respectively;
   receiving, from the unified data repository server, the plurality of sets of attributes;
   determining, based on the plurality of sets of attributes, an attribute for which to cache content;
   requesting, from the unified data repository server, a plurality of content identifiers associated with the attribute;
   receiving, from the unified data repository server, the plurality of content identifiers;
   causing content identified by the plurality of content identifiers to be cached; and
   in response to a release of the RRC connection of a first user equipment of the plurality of user equipment from to the first radio unit, removing, by the first edge compute server of the core network, a first set of attributes associated with the first user equipment from the plurality of sets of attributes.

10. The method of claim 9, wherein the plurality of user equipment are connected to the same cell, the same radio unit or the same distributed unit of the core network.

11. The method of claim 9, wherein determining the attribute includes:
identifying a most commonly occurring attribute in the plurality of sets of attributes; and
selecting the most commonly occurring attribute as the attribute for which to cache content.

12. The method of claim 9, wherein the attribute is a characteristic of the first user equipment of the plurality of user equipment, a user of the first user equipment or a subscriber associated with the first user equipment.

13. The method of claim 9, wherein the attribute is a profession of a user of the first user equipment of the plurality of user equipment, a geographic location in which the first user equipment is most commonly positioned or an age group of the user.

14. The method of claim 9, comprising:
causing the plurality of sets of attributes to be stored;
receiving an indication that the RRC connection of the first user equipment of the plurality of user equipment to the first radio unit has been released;
in response to receiving the indication, removing the first set of attributes associated with the first user equipment from the plurality of sets of attributes; and
after removing the first set of attributes from the plurality of sets of attributes, determining the attribute for which to cache content based on the plurality of sets of attributes.

15. The method of claim 9, comprising:
receiving, from the first user equipment of the plurality of user equipment, a request for first content associated with a first content identifier of the plurality of content identifiers;
in response to receiving the request, determining a size of the first content or a rate of delivery of the first content to the first user equipment; and
reporting the size or the rate to a radio access network (RAN) intelligent controller or a network data analytics function (NWDAF) server of the core network.

16. A system, comprising:
a unified data repository server; and
an edge compute server of a core network including:
a processor configured to:
receive an identity for each of a plurality of user equipment, respectively, that each have a radio resource control (RRC) connection to a first radio unit of the core network;
request, from the unified data repository server serving the first radio unit of the core network, a plurality of sets of attributes associated with the plurality of user equipment, respectively;
receive, from the unified data repository server, the plurality of sets of attributes;
determine, based on the plurality of sets of attributes, an attribute for which to cache content;
request, from the unified data repository server, a plurality of content identifiers associated with the attribute;
receive, from the unified data repository server, the plurality of content identifiers;
cause content identified by the plurality of content identifiers to be cached; and
in response to a release of the RRC connection of a first user equipment of the plurality of user equipment to the first radio unit, remove a first set of attributes associated with the first user equipment from the plurality of sets of attributes; and
a memory configured to:
store the content identified by the plurality of content identifiers.

17. The system of claim 16, wherein the processor is configured to determine the attribute by:
identifying a most commonly occurring attribute in the plurality of sets of attributes; and
selecting the most commonly occurring attribute as the attribute for which to cache content.

18. The system of claim 16, wherein the attribute is a characteristic of the first user equipment of the plurality of user equipment, a user of the first user equipment or a subscriber associated with the first user equipment.

19. The system of claim 16, wherein the attribute is a profession of a user of the first user equipment of the plurality of user equipment, a geographic location in which the first user equipment is most commonly positioned or an age group of the user.

20. The system of claim 16, wherein the processor is configured to:
cause the plurality of sets of attributes to be stored;
receive an indication that the RRC connection of the first user equipment of the plurality of user equipment to the first radio unit has been released;
in response to receiving the indication, remove the first set of attributes associated with the first user equipment from the plurality of sets of attributes; and
after removing the first set of attributes from the plurality of sets of attributes, determine the attribute for which to cache content based on the plurality of sets of attributes.

* * * * *